United States Patent [19]

Wagner

[11] 4,212,383
[45] Jul. 15, 1980

[54] DRAG CONVEYOR AND HOPPER ASSEMBLY

[75] Inventor: David A. Wagner, Middlesex, N.J.

[73] Assignee: Research-Cottrell, Inc., Somerville, N.J.

[21] Appl. No.: 962,026

[22] Filed: Nov. 20, 1978

[51] Int. Cl.² .................... B65G 19/00; B65G 21/10; B65G 41/00
[52] U.S. Cl. .................... 198/616; 198/735; 198/816; 198/862; 414/327
[58] Field of Search .............. 198/538, 550, 560, 616, 198/728, 735, 812, 813, 816, 860, 862; 222/371, 415; 414/327, 528

[56] References Cited

U.S. PATENT DOCUMENTS

| 782,050 | 2/1905 | Plunket | 198/616 |
| 1,348,490 | 8/1920 | Gill | 198/816 X |
| 1,852,488 | 4/1932 | Stewart et al. | 198/862 X |
| 2,646,899 | 7/1953 | Stover | 414/327 |
| 2,748,993 | 6/1956 | Forrest | 222/415 |
| 3,273,694 | 9/1966 | Joslin | 198/816 |
| 3,820,650 | 6/1974 | Garvey | 198/860 X |
| 4,042,129 | 8/1977 | Hampton | 198/616 X |

*Primary Examiner*—James L. Rowland
*Attorney, Agent, or Firm*—Harold L. Stowell

[57] ABSTRACT

A shop assembled drag-type conveyor is provided with means for shortening its length and width and the conveyor is placed in assembled, but shortened form in a dust hopper of an electrostatic precipitator. When the conveyor is in place it is lengthened to its operating length and its width is expanded and attached to the side walls of the dust hopper with a minimum of on-site construction.

6 Claims, 3 Drawing Figures

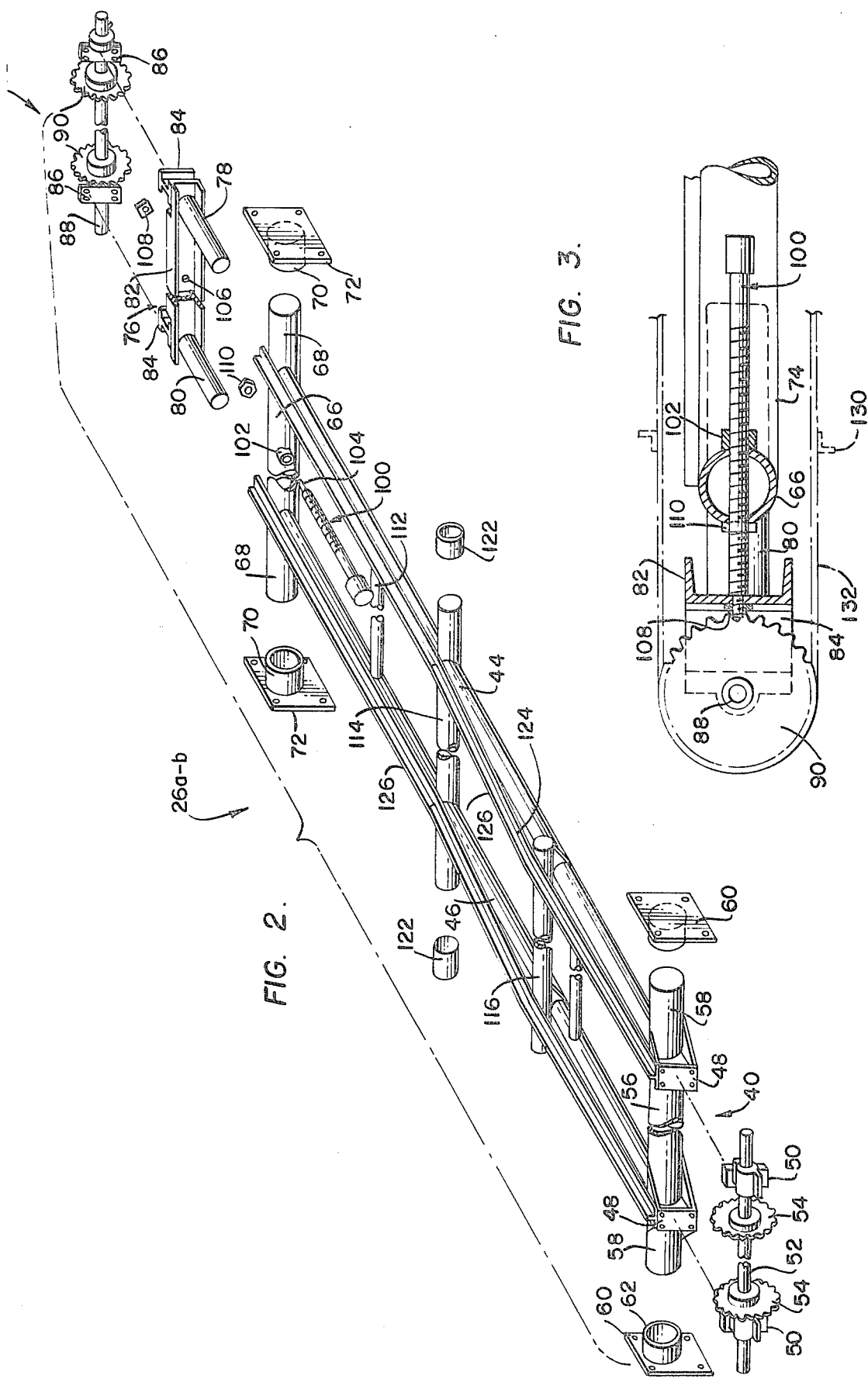

DRAG CONVEYOR AND HOPPER ASSEMBLY

TECHNICAL FIELD

The use of drag conveyors in dust hoppers of electrostatic precipitators can eliminate dust re-entrainment 100 percent. The present invention is directed to a drag conveyor which has better reliability and shorter field construction hours as the conveyor per se is manufactured in the shop under tightly controlled conditions.

BACKGROUND OF PRIOR ART

Drag scrapers or conveyors have been used in electrostatic precipitators of the dry type for a number of years as the use of drag conveyors eliminate dust re-entrainment. Historically, the drag conveyor mechanisms consisted of a pair of parallel shafts set at opposite ends of the precipitator's shell. The shafts hold sprockets that pull scraper bars attached to large chains across the bottom of the precipitator hopper, scraping the accumulated collected particulate material into a small hopper carrying, for example, a screw conveyor. The drag conveyor thus consists of a number of individual components, parts, and pieces which were assembled inside of the precipitator at the job sight. Such fabrication was time consuming and the cramped work area made assembling difficult. Further, most of the labor required for the assembly of various components of the drag conveyor had to be done by highly skilled millwrights due to the precise alignment required of the moving parts. The confined work area, plus the precision workmanship has resulted in high labor costs. Even with precision workmanship, field construction decreased reliability, and increased maintenance costs.

BRIEF SUMMARY OF THE INVENTION

The present invention is directed to a drag conveyor which is shop assembled, and lowered in its fully erected, and telescoped condition into a precipitator hopper at a convenient stage of construction. The drag conveyor is then extended to its fully operative size and welded to the hopper walls to complete the assembly. Thus, the invention may be defined as a drag conveyor and hopper assembly characterized by a hopper having a generally quadrangular base and vertical side walls, with a conveyed material receiving trough along one side of the base and a drag conveyor mounted in the hopper. The drag conveyor is characterized by having a main frame comprising at least a pair of spaced-apart longitudinal frame members, telescopically extendable at one end with means for extending and retracting the telescopically extendable end. The conveyor also includes at least a pair of longitudinally spaced transverse members rigidly connected to the frame members and extending transversely therebeyond. The transverse members are provided with hopper wall engaging support members which are telescopically mounted at the outboard ends of the pair of transverse members. The assembly also includes an idler shaft and a drive shaft, each carrying a pair of transversely spaced chain sprockets mounted at opposite ends of the frame members, and a pair of drag chains mounted between the sprockets with a plurality of drag bars connected between the pair of chains.

BRIEF DESCRIPTION OF THE DRAWINGS

The invention will be more particularly described in reference to the accompanying drawings wherein:

FIG. 2 is an enlarged exploded perspective view of one of the drag conveyors of the present invention; and FIG. 3 is a section on line 3—3 of FIG. 1.

DETAILED DESCRIPTION OF INVENTION

Figure 1:
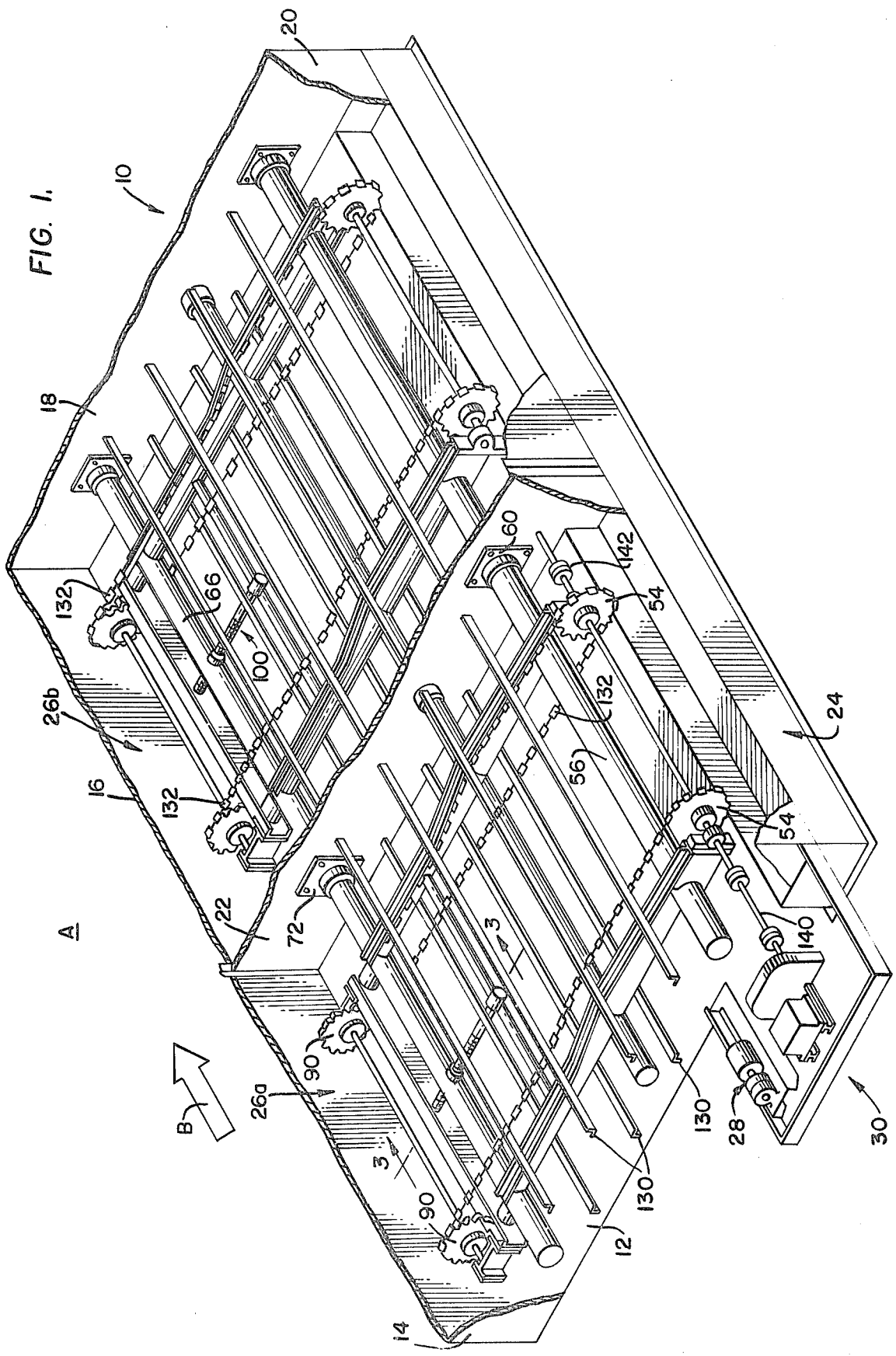
FIG. 1 is a fragmentary perspective view of a pair of drag conveyors mounted in a drag conveyor hopper of an electrostatic precipitator.

Referring to the drawing, 10 generally designates a precipitator hopper drag conveyor assembly. The precipitator hopper includes a quadrangular base wall 12 and vertical upstanding wall members 14, 16, 18 and 20. The interior of the hopper or conveyor pan 10 is divided by a center bulkhead 22, and gas flow through the precipitator, indicated at A, would be in the direction of the directional arrow B. Along one longitudinal end of the hopper is mounted a trough generally designated 24 which trough receives material from the pair of drag conveyors, generally designated 26a and 26b. Mounted within the trough 24 is a conventional screw conveyor, not shown, which directs the precipitated ash or other particulate material into collection or disposal means as the case may be.

Along the upstream wall 14 of the hopper is mounted a housing generally designated 28, which housing contains a drive motor and reduction gear means generally designated 30, for the pair of drag conveyors 26a and 26b. The drive unit 28 is mounted externally of the wall 14 to facilitate maintenance and repair.

Each of the drag conveyors 26a and 26b are identical in construction, and the conveyors will be described in particular reference to FIGS. 2 and 3.

The conveyor 26a-b has a drive end 40 and an idler end 42. The chassis of the conveyor is composed of primary longitudinal tubular frame members 44 and 46. Frame members 44 and 46, at drive end of 40, of the conveyor are provided with end fitments 48, which end fitments receive bearing blocks 50. The bearing blocks rotatably support a drive shaft 52 and inboard of each of the bearing members 50 are secured a pair of spaced-chain sprockets 54. Just upstream of the end of fitments 48 is rigidly secured a transverse member 56, which transverse member acts as a spacer for longitudinal frame members 44 and 46, and the outboard ends thereof, designated 58, provide anchoring means for one end of the conveyor. The anchoring means in the illustrated form of the invention comprise plates 60 to which are welded hollow cylindrical members 62. The internal diameter of the cylindrical members 62 are sized to slidably receive ends 58 of the transverse member 56, and the length of each of the end members 62 is selected to permit a predetermined sliding motion of the end members on the end 58 of the transverse member 56 to provide for adjustment during mounting of the conveyor in the hopper as to be more fully described hereinafter.

Where the width of the conveyor is, for example, six feet, it has been found that three inches of lateral adjustment is adequate. Adjacent the opposite end of the conveyor is rigidly secured a second transverse member 66, which transverse member has ends 68 adapted to slidably receive end cylindrical cap members 70 welded to mounting plates 72 as hereinbefore described in reference to mounting plates 60 at end 40 of the conveyor.

The extended ends 74 and 76 of cylindrical frame members 44 and 46 slidably receive therein frame extension members 78 and 80 respectively. Frame extension members 78 and 80 are secured, such as, by welding to the ends of a frame 82 provided with fitments 84 which in turn mount bearing elements 86 which rotatably carry an idler shaft 88. Attached to the idler shaft are a pair of idler sprockets 90 which are companions to drive sprockets 54.

In order to extend and retract the end 42 of the conveyor, to provide for insertion of the conveyor in the hopper and to extend the conveyor to its operative position, a capson headed threaded shaft generally designated 100, is rotatably received in a bushing 102 welded in a bore in the transverse member 66. The opposite end of the threaded shaft, end 104, passes through a bore 106 in end frame member 82, and is rotatably engaged in bearing member 108, welded to the outer face of the frame element 82 opposite the opening 106. A locking nut 110 completes the take-up assembly.

With the assembly, it will be seen that reverse operation of the threaded shaft 100 permits the end 82 to be urged forwardly to decrease the length of the conveyor, and rotation in the opposite direction forces the end 42 outwardly to its operating length and thereafter tightening of the nut 110 against the inner face of the transverse end member 82 will hold the conveyor in its extended length until a field weld is made between the ends of longitudinal frame members 44 and 46, and their extensions 78 and 80.

For strength a number of additional transverse elements designated 112, 114, and 116 are provided to complete the chassis assembly, and it will be noted that transverse member 114 may be provided with take-up caps 122, which like in plates 60 and 72, would be welded to the side walls and/or transverse partition in the hopper.

Chain guide rails, in the form of L-channel members 124 extend along the top surface of the conveyor chassis and upon the upper edges 126 thereof the drag bars 130 are carried. To accommodate the drag chain catenary sag the track or guide elements 124 adjacent drive end 40 are supported from the main longitudinal frame members 44 and 46 by the transverse pipe 116, as more clearly illustrated in FIG. 2 of the drawing.

Following installation of each of the conveyors 26a and 26b within the hopper, shaft coupling means 140 connects drive shaft 52 with the drag drive unit 28 and an equivalent coupling 142 connects the two drive shafts 52 of conveyors 26a and 26b together so that the single drive unit functions to drive both of the paired drag conveyors.

As hereinbefore set forth, each of the conveyors 26a and 26b are assembled in a conveyor shop under controlled conditions employing the necessary jigs, etc., to insure accuracy and alignment of the operating mechanism. The conveyor is then shipped to the erection site of the electrostatic precipitator and at the proper time each conveyor has its idler end 42 telescoped in respect to the remainder of the chassis and frame is lowered into the hopper. There, in-the-field personnel extend the conveyor, level it and weld the end caps 60, 72 and 122 to the permanent walls or bulkheads of the hopper and make the final connections to the drive unit.

In the illustrated form of the invention the drag conveyors are mounted in the hopper in a transverse drag conveyor arrangement; however, it will be recognized a longitudinal drag conveyor arrangement may be used without departing from the teachings of the invention.

STATEMENT OF INDUSTRIAL APPLICATION

The foregoing described drag conveyor precipitator is designed for easy erection and great reliability and the shop assembled conveyors can be trucked to any location, require no special field assembly and are ready for erection upon arrival at precipitator site.

I claim:

1. A drag conveyor and hopper assembly characterized by a hopper having a generally quadrangular base and vertical side walls, a conveyed material receiving trough along one side of the base, and a drag conveyor, said drag conveyor having a main frame comprising at least a pair of spaced apart longitudinal frame members telescopically extendable at one end, means for extending and retracting said telescopically extendable end, at least a pair of longitudinally spaced transverse members rigidly connected to said frame members and extending transversely therebeyond, hopper wall engaging support members telescopically mounted at the outboard ends of the at least one pair of transverse members, an idler shaft and a drive shaft each carrying a pair of transversely spaced chain sprockets mounted at opposite ends of the frame members, a pair of drag chains mounted between said sprockets and a plurality of drag bars connected between said pair of chains.

2. The invention defined in claim 1, wherein the hopper wall engagable support members are welded to the walls of said hopper after the drag conveyor has been inserted in the hopper and leveled.

3. The invention defined in claim 2, wherein the length of the drag conveyor is telescopically extended to its operating length after insertion of the drag conveyor in said hopper and the conveyor is attached to the side walls of said hopper.

4. The invention defined in claim 2, wherein the hopper is provided with a transverse bulkhead dividing the hopper into a pair of conveyor pan spaces, and a drag conveyor is installed in each of said conveyor pan spaces.

5. The invention defined in claim 4, wherein the drive shafts of said pair of drag conveyors are connected and a single drive unit means, drives said connected drive shafts.

6. The invention defined in claim 5, wherein the drive means for the drag chains is mounted externally of one of the side walls of said hopper to thereby simplify the maintenance of the drive assembly.

* * * * *